United States Patent [19]

Helveston et al.

[11] 4,293,241
[45] Oct. 6, 1981

[54] BARGE BUMPER ASSEMBLY

[75] Inventors: Wilton L. Helveston; Richard J. Pecoraro, both of New Iberia, La.

[73] Assignee: International Moorings & Marine, Inc., New Iberia, La.

[21] Appl. No.: 14,806

[22] Filed: Feb. 26, 1979

[51] Int. Cl.³ .............................................. E02B 3/22
[52] U.S. Cl. .................................... 405/213; 114/219; 114/220
[58] Field of Search ................ 114/219, 220; 267/139, 267/140; 405/212, 213, 214, 215

[56] References Cited

U.S. PATENT DOCUMENTS

| | | | |
|---|---|---|---|
| 3,564,858 | 2/1971 | Pogonowski | 114/219 |
| 4,005,672 | 2/1977 | Files | 114/219 |
| 4,084,801 | 4/1978 | Landers | 114/219 |
| 4,098,211 | 7/1978 | Files | 114/219 |

Primary Examiner—Trygve M. Blix
Assistant Examiner—D. W. Keen
Attorney, Agent, or Firm—Guy E. Matthews

[57] ABSTRACT

A bumper assembly for a marine structure is disclosed, comprising an essentially vertical frame member mounted by energy absorbing shock members at each end thereof to a stationary offshore structure, the vertical member carrying annular bumper members stacked thereon. The vertical member comprises concentric cylinders in order to extend the length thereof slightly as the shock absorbing members are actuated so that the movement of such shock absorbing members remains linear. At each end of the vertical support member, at the point of attachment of the shock absorbing member, a supporting chain or cable is attached to support such vertical member to prevent the vertical member from creating a cantilever effect on the shock absorbing members.

2 Claims, 1 Drawing Figure

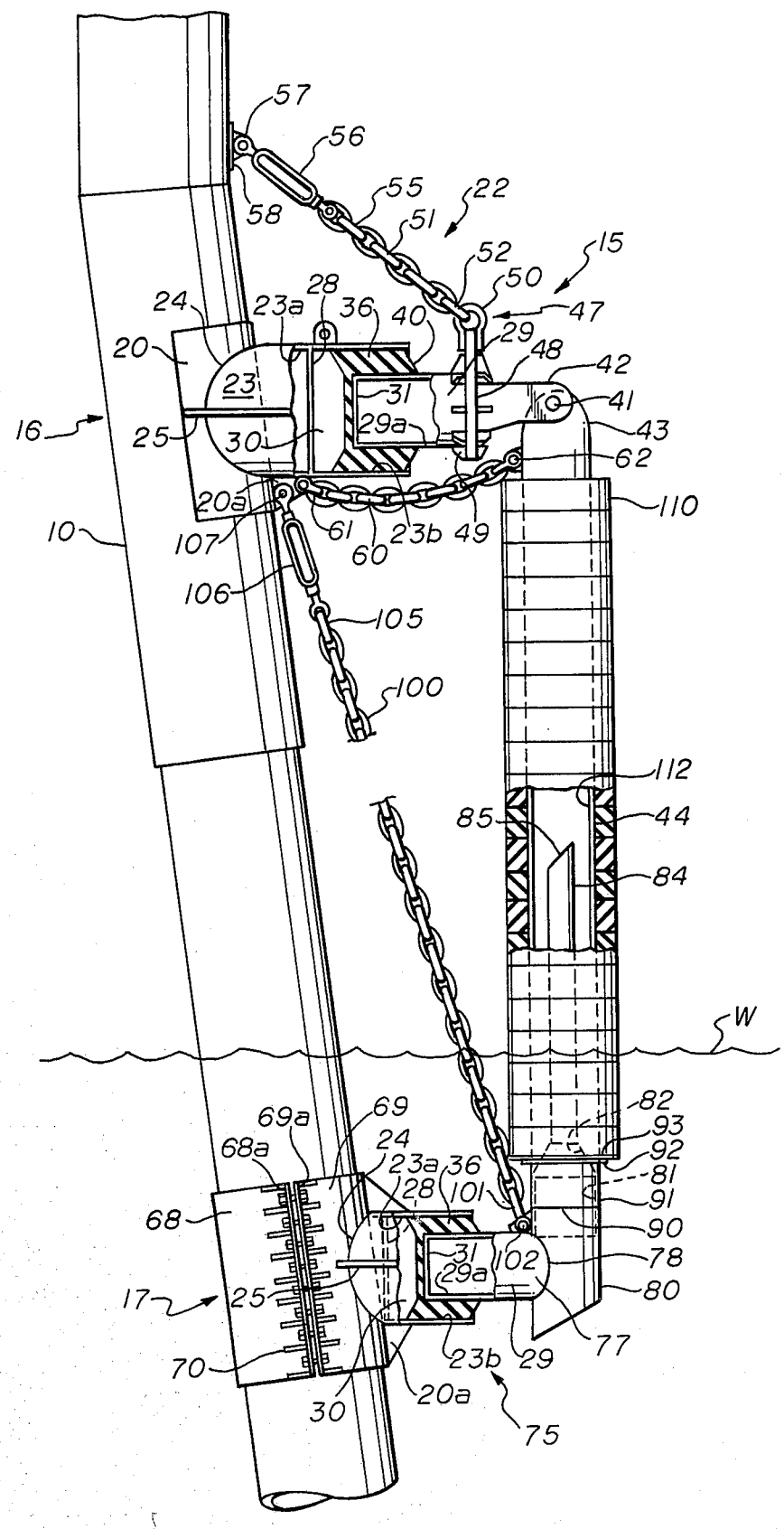

BARGE BUMPER ASSEMBLY

BARGE BUMPER ASSEMBLY

1. Field of the Invention

This invention relates to a barge bumper assembly utilizing dual shock cells for use in preventing damage to offshore tubular members and the like from boats, barges, and other vessels.

2. Description of the Prior Art

It is well known to utilize certain bumper fendering and other type assemblies for protecting docks and tubular members such as flow line risers or legs of drilling platforms such as that disclosed in U.S. Pat. No. 4,005,672 and U.S. Pat. No. 3,991,582.

The main problem with such assemblies has been the lack of provision for any lateral movement of the barge bumper assembly and the failure to provide for shock assemblies at the lower end of the barge bumper assembly which thus caused the lower ends to become crushed or bent which meant that sometimes the whole assembly or at least the bottom shock cell assembly had to be replaced.

BRIEF SUMMARY OF THE INVENTION

It is an object of the present invention to provide a new and improved rugged and reliable barge bumper assembly which will withstand the wear, tear, and shock from offshore vessels to prevent damage to flow line risers, legs of drilling platforms, and the like.

BRIEF DESCRIPTION OF THE DRAWINGS

The FIGURE is a side sectional view of the barge bumper assembly of the present invention.

DESCRIPTION OF THE PREFERRED EMBODIMENTS

As illustrated in the FIGURE, an offshore flow line riser or leg 10 of the present invention is partly shown, and as is well known, the leg is normally mounted with a drilling rig or the like which includes a plurality of legs extending downwardly to the floor (not shown) of the ocean to support the drilling rig and the like. As further illustrated, the drilling leg or flow line riser 10 extends upwardly from the floor of the ocean to the surface or wave action area W of the body of water to upwardly support the drilling rig, platform, or other structures (not shown).

The barge bumper assembly of the present invention is illustrated by the numeral 15 and includes upper and lower connection members generally designated at 16 and 17, respectively. As illustrated, upper connection member 16 includes a plate 20 fitted to the contour of the member 10 and welded thereon.

A shock cell generally designated at 22 includes an outer diameter cylinder 23 secured at 24 as by welding to plate 20 and a plurality of support ribs 25 is mounted to the side walls of the cylinder 23 and the plate 20 to provide support for such cylinder 23. An end of ram plate 28 shown by the dotted lines is mounted to the circumferential inside walls 23a of cylinder walls 23 for a purpose to be explained hereinafter. A piston 29 extends inwardly into the interior area 30 adjacent said wall 28 such that movement of the piston 29 into the area 30 causes the cylinder head 31 to contact the wall 28 to prevent further movement of the piston member 29. As further illustrated in the FIGURE, a plurality of resilient material 36 such as castable polyurethane is mounted to the interior wall 23b forward of the wall 28 and sealingly grips the piston exterior wall 29a as illustrated about such cylindrical wall 29a such that inward movement of piston 29 causes the polyurethane to deform and move downwardly toward the wall 28, and when the force sufficient to cause such inward movement has been eliminated, the polyurethane pushes the piston outwardly to the position illustrated in the FIGURE. As further illustrated, the castable polyurethane is further cast such that it extends outwardly at 40 to form an outwardly extending annular lip seal around such piston member 29.

A pivot pin 41 connects the end 42 of the piston 29 to an upper portion 43 of a bumper retaining member 44.

As further illustrated in the FIGURE, a retaining member 47 includes a plate 48 and a plurality of support ribs 49 mounted with a suitable eye attachment 50 by pin means (not shown) to a chain 51 secured at one end 52 to the eye 50 and at the other end 55 to a suitable shackle member 56 as is well known in the art which is suitably and pivotally mounted with a pad eye member 57 which is welded as at 58 to the leg or flow line riser 10 for supporting the shock cell assembly 22 in an upright parallel position and for preventing undesirable or unwanted lateral movement (in this instance into and out of the sheet of drawings) in the shock cell assembly 22.

As further illustrated in the FIGURE, yet another chain 60 is secured at one end 61 to a rib member 20a extending outwardly from the attaching means 20 and at its other end 62 to the upper portion 43 of the bumper assembly member 44.

The lower connection member 17 includes two half plates 68 and 69 which are welded or otherwise suitably attached to the member 10 and which are connected to each other along ribs 68a and 69a by any suitable means such as welding or by bolts, and as further illustrated, each plate includes support ribs 70. It is to be understood that if plates 68 and 69 are bolted suitably around the flow line riser or leg 10, that a lateral blow to a shock cell assembly 75 would enable such shock cells to move slightly relative to such blow to prevent undue shearing and damage to the total barge bumper assembly 15.

The shock cell assembly 75 operates in the same manner as the shock cell assembly 22 and thus has been given the same numerals to indicate the similarity of operation including the positioning of the cstable polyurethane 36.

As further illustrated, the end 77 of the piston 29 extending outwardly from the interior of the cylinder 23 is suitably secured such as by welding at 78 to a stinger or stabbing base member 80. The stabbing base member 80 extends upwardly and is tapered inwardly as at 81 and further tapered inwardly at section 82 to form a stinger or stabbing member 84 which extends upwardly to terminate at end 85. As further illustrated, the member 44 is pivotally attached at 51 through a suitable pivot pin (not shown) to the end 42 of piston member 29 in the upper shock assembly 22 and extends downwardly such that member 44, which is a cylindrical hollow member, is positioned concentrically relative to stabbing member 85 to terminate at 90 on base member 80 by wedging base member 80 due to the taper of such base member 80 such that base member 80 has a larger cylindrical diameter than member 44.

As further illustrated in the FIGURE, base member 80 also extends upwardly and includes a straight cylindrical wall portion 91 which extends upwardly and is attached to rigid support plate 92 which receives and supports a loose barge bumper support plate 93. It is to be understood that both plates 92 and 93 have openings (not shown) therein for enabling the base 80 of the stabbing member and the member 44 to extend therethrough.

As further illustrated in the FIGURE, a support member such as chain 100 is mounted at one end 101 to a support rib 102 which is mounted to the piston member 29 and stabbing base 80 and at the other end 105 of such chain member 100 to a suitable shackle member 106 which in turn is mounted through a pivotal pin support 107 to support member 20a.

As further illustrated in the FIGURE, a plurality of polyurethane bumpers 110 is positioned to fit such that openings 112 in the bumpers 110 loosely and circumferentially fit around cylindrical member 44 from the loose bumper support plate 93 upwardly to adjacent the upper portion 43 of such member 44.

In operation, as a vessel, barge, tug, or the like approaches offshore platforms or flow line risers, there is a real danger that such flow line risers and legs might crushed or severely damaged to cause structural damage to such legs to cause same to be replaced. Such replacement cost is extremely expensive and time consuming, and thus the barge bumper assembly 15 of the present invention is designed to attempt to eliminate any unwarranted damage to such flow line risers, legs, and the like. As a vessel (not shown) approaches the structure, due to the positioning of the barge bumper assembly 15 relative to the wave action area, the vessel contacts the polyurethane or rubber bumpers or cylindrical rubber bumpers 110 which exerts force on the bumpers 110 and transmits same to the member 44. Due to the fact that the plate 93 is loose, the bumper assemblies, which are unconnected to each other, are permitted to move or rotate as desired.

The lateral vector of the force would normally attempt to shear each of the shock cells 22 and 75, but the upper shock cell assembly 22 is prevented from being laterally sheared off the member 15 by chain members 51 and 60, and the welded attachment at plate 20. The lower shock cell assembly 75 is prevented from being sheared laterally by the chain member 100 and the plate assembly 17.

If the shock force is parallel with the sheet of drawing of the FIGURE, either or both of the shock cells operate to absorb the force of the blow such that the member 44 drives the piston 29 relative to the upper shock cell assembly 22 inwardly until the head 31 of piston 29 strikes the plate 28 to prevent further movement thereof. The resistant material 36 then drives the piston member 29 back outwardly relative to the cylinder 23 as the resistant member 36 overcomes the force which originally moved the piston inwardly. It is to be understood that the bottom shock cell assembly 75 operates in exactly the same way except that pressure upon the bumpers 110 causes the stabbing member 80 to drive the piston 29 inwardly relative to the wall 28.

If the shock cell assemblies 22 and 75 or the member 44 are damaged, it is quite simple to disassemble some portion of the barge bumper assembly without the necessity of replacing the whole system, which thus aids greatly in the economy of the barge bumper assembly.

While only one embodiment has been disclosed herein, it is to be understood that the claims of the present invention are not limited to the particular or specific embodiment disclosed but other embodiments are entitled to all equivalents of this embodiment as consistent with constraints imposed by any of the prior art.

What is claimed is:

1. Offshore platform structures to prevent damage to such structures by vessels and the like comprising:
  (a) an upper shock cell assembly including a rigid cylinder mounted with such structure and a movable piston for moving in and out of said rigid cylinder and further including a resistant resilient material for positioning said piston inside said rigid cylinder and wherein said shock cell assembly operates such that movement of said piston relative to said rigid cylinder by vessels and the like must overcome the resistant resilient force and wherein cessation of the pressure by such vessel enables said resistant resilient material to return said piston to its original position relative to said rigid cylinder;
  (b) a second lower shock cell assembly including a rigid cylinder mounted with such structure and a movable piston for moving in and out of said rigid cylinder and further including a resistant resilient material for positioning said piston inside said rigid cylinder and wherein said lower shock cell assembly operates such that movement of said piston relative to said rigid cylinder by vessels and the like must overcome the resistant resilient force and wherein cessation of the pressure by such vessel enables said resistant resilient material to return said piston to its original position relative to said rigid cylinder;
  (c) a stabbing member being attached to the opposite end of said piston of said lower shock cell assembly, said stabbing member including a cylindrical stabbing base, an inwardly tapered portion above said stabbing base, and an upwardly extending stinger attached to said tapered portion;
  (d) a cylindrical, hollow bumper assembly member pivotally mounted at its upper end to the opposite end of said upper shock cell assembly to said piston of said upper shock cell assembly and depending downwardly therefrom to concentrically fit around said stabbing base for maintaining said hollow cylindrical member and stabbing member in a vertical manner relative to each other, said bumper assembly including a rigid support plate fixed thereto adjacent the lower end thereof;
  (e) a bumper support plate supported by said rigid support plate, said bumper support plate having an opening therethrough to fit loosely about said bumper assembly; and
  (f) a plurality of cylindrical shaped resilient bumper members supported about said bumper assembly on said bumper support plate having openings therein for fitting rotatably around said bumper assembly member wherein contact on the outer surface of said bumpers with a vessel and the like causes one or both of said upper and lower shock cell assemblies to operate such that each of said pistons is driven inwardly relative to said leg or structure and wherein cessation or elimination of pressure on said bumpers enables said resilient, resistant means to return said pistons to their original positions.

2. The structure as set forth in claim 1 including means mounted with each of said upper and lower shock cell members to prevent unwanted lateral movement of said upper and lower shock cell members due to shear or stress forces caused by vessels or other floating members.

* * * * *